United States Patent [19]

Reeve et al.

[11] Patent Number: 4,689,409
[45] Date of Patent: Aug. 25, 1987

[54] STARCH SEPARATION PROCESS

[75] Inventors: Alan L. Reeve, Leefdaal, Belgium; Henry H. Nonaka, Orland Park, Ill.

[73] Assignee: CPC International Inc., Englewood Cliffs, N.J.

[21] Appl. No.: 835,704

[22] Filed: Mar. 3, 1986

[30] Foreign Application Priority Data

Apr. 30, 1985 [GB] United Kingdom ............... 8510893

[51] Int. Cl.$^4$ .............................................. C08B 30/10
[52] U.S. Cl. .................................. 536/102; 530/374; 530/375; 426/436
[58] Field of Search ................ 530/374, 375; 426/436; 536/102

[56] References Cited

U.S. PATENT DOCUMENTS

| | | | |
|---|---|---|---|
| 2,829,987 | 4/1958 | Bus et al. | 536/102 |
| 3,574,180 | 4/1971 | Johnston et al. | 530/374 |
| 3,790,553 | 2/1974 | Rao et al. | 530/375 |
| 3,846,397 | 11/1974 | Ernster | 426/436 |
| 4,125,528 | 11/1978 | Rao et al. | 426/436 |
| 4,201,708 | 5/1980 | Rao et al. | 426/436 |
| 4,494,530 | 1/1985 | Jansma et al. | 530/375 |
| 4,587,332 | 5/1986 | Lane et al. | 536/102 |

FOREIGN PATENT DOCUMENTS

| | | | |
|---|---|---|---|
| 1541182 | 2/1979 | United Kingdom . | |
| 2032245 | 5/1980 | United Kingdom | 530/374 |

OTHER PUBLICATIONS

Simpson, *Canadian Journal of Technology*, 33, 33–40, (1955).

*Primary Examiner*—Ronald W. Griffin

[57] ABSTRACT

A process for the production of starch and gluten from wheat flour or similar flour. The flour is extracted with water so as to produce a starch fraction and a gluten fraction. A 'B' starch is then separated from either the starch fraction or the gluten fraction and contacted with an aqueous alkali at a pH between 8.5 and 12.5 to give a starch suitable for conversion to starch hydrolyzates by enzymatic hydrolysis.

6 Claims, No Drawings

STARCH SEPARATION PROCESS

FIELD OF THE INVENTION

The present invention relates to a process for the production of starch, in particular, to a process for the production of wheat starch.

BACKGROUND OF THE INVENTION

In the production of starch from wheat grain, it is common practice, firstly, to mill the grain to separate the bran and fiber, and then to treat the wheat flour obtained to isolate starch and gluten (protein) fractions. A number of methods have been proposed for this latter separation but two in particular may be singled out for mention. The first involves mixing the flour with water to form either a dough or batter and using water to extract the gluten by a physical separation often involving centrifugal action. This process suffers, however, from the disadvantage that a clean-cut separation of starch and gluten is not obtained even when a sophisticated separation system is employed, e.g., a multistage separation system using a bank of hydrocyclones. Generally, some of the starch obtained is of inferior quality and is unsuitable for use as a feedstock for hydrolysis to oligo- and monosaccharides, such as glucose.

A second method which has been proposed for the separation of starch and gluten is a chemical treatment in which the gluten is dispersed or dissolved in an alkali solution from which it is subsequently liberated by acidification. Typical alkalis which may be used include sodium hydroxide, potassium hydroxide, calcium hydroxide and barium hydroxide; sodium hydroxide being preferred. In such a process, the wheat flour is typically slurried with sodium hydroxide and the slurry subjected to a centrifugal treatment to separate the solid starch from the protein solution. The starch obtained in this way contains all the alkali-insoluble solids of the flour, e.g., cellulosic cell-wall fragments and bran. In addition, there is some gelatinized starch present arising from particles damaged by milling. This starch may subsequently be treated, e.g., by centrifugation or by "tabling" (a form of decantation) to produce a prime quality starch and inferior quality starch. The gluten from the process is, however, of inferior quality compared with that obtained by the water-washing process and dual quality starch is obtained.

It has also been proposed, in U.S. Pat. No. 3,790,553, to use a water extraction of the gluten in conjunction with alkali treatment of the starch. In the process described in the U.S. patent, the whole wheat kernel is crushed and slurried with water which dissolves the low molecular weight proteins. The residue from the first step, containing the starch, is then slurried with a mild base, preferably ammonium hydroxide, and centrifuged to obtain phase separation. The supernatant liquid from the separation contains the high molecular weight protein, while the residue contains the starch and any other residual alkali insoluble products. Strongly basic alkalis are not recommended for use in the process of the U.S. patent since they are said to affect adversely the quality of the protein obtained. The process described in U.S. Pat. No. 3,790,553 is primarily directed at obtaining high quality protein from whole wheat kernel and is less concerned with the quality of the starch.

Another modification of the aqueous starch/gluten separation process uses an enzymatic treatment to recover all of the starch. This process is described in the *Canadian Journal of Technology*, Vol. 33, pp. 33 to 40, in an article entitled "Separation of Starch and Gluten, VII. The Application of Bacterial Pentosanases to the Recovery of Starch from Wheat Flours". In the process described in this article, wheat flour is extracted with water to yield gluten and a starch milk. The starch milk is then centrifuged to give product in the centrifuge consisting of a hard starch and an inferior quality "squeegee starch" on top of the hard starch. The latter is scraped off the hard starch and consists of strongly hydrated pentosan masses in which starch granules, nitrogenous materials and fiber are embedded. The process described uses a bacterial pentosanase to hydrolyze the pentosans under carefully-controlled conditions, so releasing the embedded starch granules. The process described in the Canadian journal was only investigated on a laboratory scale, and problems, such as enzyme deactivation, enzyme color, and possible enzyme affects on the starch and gluten, were not addressed.

We have now devised a process for the separation of starch and gluten which produces gluten of high quality (so-called "vital gluten") and higher in quality than that produced by the alkali treatment of wheat flour described above. The process also produces starch of high quality, substantially all of which may be used as a feedstock for subsequent hydrolysis processes. In addition, the process is simple to operate on a commercial scale and avoids the uncertainties involved in using a pentosanase.

The process of the invention is a modification of the water extraction process described earlier in this specification. As has been mentioned in connection with that method, it is not possible on a commercial scale to obtain a clean-cut separation of the starch and gluten, and depending upon the separation process adopted and its method of operation, either the gluten fraction contains some starch or the starch fraction contains some gluten. In both cases, a subsequent separation step is required to obtain pure starch or pure gluten, and, in both cases, the by-product is a poor quality starch which typically contains 75–95% by weight starch together with some gluten but also other impurities, such as pentosan and hemicellulose. The process described in the Canadian Journal of Technology referred to above obtains the high quality starch and low quality or "squeegee starch" together in the centrifuge, and the latter is then physically separated, e.g., by a scraper. We have found that in a process in which the starch and gluten are separated in a hydrocyclone battery, some starch is carried over with the gluten from which it may be separated in a subsequent process step, e.g., by using a screen. The residual starch which is separated from the gluten in this way is similar in nature to the "squeegee starch". For convenience, the main starch product which is of good quality may be referred to as 'A' starch, while the "squeegee" or inferior quality starch may be called 'B' starch.

SUMMARY OF THE INVENTION

According to this invention, there is provided a process for the production of starch and gluten from wheat or similar grain which comprises mixing the grain, preferably in the form of flour, with water to release the gluten from the starch in the flour. The mixture of flour and water is separated into a starch fraction and a gluten fraction. Then a 'B' starch fraction, as hereinbefore defined, is separated from either the starch fraction or the gluten fraction. The 'B' starch fraction is contacted with an aqueous alkaline solution at a pH between about 8.5 and about 12.5, and starch is recovered from the aqueous alkaline solution.

DETAILED DESCRIPTION OF THE INVENTION

The aspects of the process which concern the separation of the starch and the gluten fractions from the wheat or similar grain are conventional. Thus, the grain is preferably in the form of flour, e.g., wheat flour, which is mixed with water to form a dough or batter. The dough or batter is then subjected to water extraction in one of a number of known ways followed by separation of the starch and gluten. For example, a dough may be agitated with water in a holding tank and the starch and gluten separated by use of screens. Alternatively, the separation may take place in a battery of hydrocyclones in which the gluten is separated as an overflow and the starch as an underflow. The gluten fraction which is separated in the hydrocyclones may also comprise water and some starch, and by a subsequent conventional phase separation process, e.g., by screening, the gluten and 'B' starch are separated. It is the latter which is subjected to the treatment with aqueous alkali.

The 'B' starch, which has been separated from the starch fraction or gluten fraction, is suitably contacted with the aqueous alkali in a mixing tank in which agitation takes place. This treatment with aqueous alkali may be operated batchwise or continuously, the latter being more readily adapted to a continuously operated grain processing plant. After separation, the starch may finally be purified by water and/or acid washing.

Preferably, the alkali is a strong alkali, such as sodium hydroxide or potassium hydroxide, especially sodium hydroxide, and the pH is preferably about 10 to about 11. The 'B' starch may be contacted with the alkali at any temperature below the gelatinization temperature of the starch, ambient temperature being satisfactory, and while the time of contact is not critical, suitable times lie in the range between about 2 minutes and about 3 hours, e.g., 10 to 60 minutes. In order to provide the desired pH, the aqueous alkali solution may contain about 0.5 to about 20 weight % solid alkali, e.g., 2 to 10 weight %.

In the course of contacting the 'B' starch with the aqueous alkali, not only is the starch separated from the pentosans but also it is freed from residual protein and other impurities. Since the gluten has already been separated from the starch, the quality of the gluten is unaffected and remains as vital gluten. The material extracted from the 'B' starch by the alkali does not reduce to a significant extent the recovery of desirable components from the wheat or other grain. The starch which is obtained is of sufficiently high quality to be used as the feedstock for conversion to lower polysaccharides or monosaccharides by, for example, enzymatic hydrolysis. In the absence of the alkali treatment, in accordance with process of the invention, the 'B' starch is unsuitable for such use.

The invention will now be further described with reference to the following examples.

EXAMPLE 1

A wheat flour was mixed with water in an approximately 1:1 weight ratio and the dough so produced held to allow for maturation and for optimal gluten formation. The material was then pumped into a dilution tank and thereafter to an intermediate stage of a battery of hydrocyclones. The gluten, water, and some starch separated from the battery as an overflow fraction and most of the starch as an underflow fraction.

The gluten fraction was next screened to separate the gluten from the residual starch and other contaminants, such as pentosans. The residual or 'B' starch stream was centrifuged and the underflow, a slurry containing 17.7% by weight suspended or dissolved solids, was fed continuously at 400 liters/hour through a mixer into a buffer tank fitted with an agitator. A 5% by weight solution of sodium hydroxide was added continuously to the mixer so that the pH in the buffer tank was maintained at 11.0. The volume of the slurry in the tank was maintained at 100 liters by passing slurry to a decanter at the necessary rate. The nominal residence time of slurry in the buffer tank was therefore about 15 minutes, the temperature being ambient.

The solids underflow from the decanter was dispersed, by passage through a mixing pump, in fresh water provided at a rate of 200 liters/hour. The resulting slurry was then separated in a second decanter, the starch-containing underflow being neutralized with dilute hydrochloric acid to pH 6.2.

76.5% by weight of the starch available in the 'B' starch from the gluten fraction was recovered and had the following composition. For comparison, the composition of the 'B' starch before the treatment is also shown. The percentages are weight/weight on a dry basis.

|  | 'B' Starch (%) | 'B' Starch After Treatment (%) |
| --- | --- | --- |
| Starch Content | 77.9 | 98.9 |
| Protein Content (N × 5.7) | 4.8 | 0.4 |
| Sugars | 4.8 | <0.1 |
| Ash | 1.3 | 0.5 |
| Ether-Extractable Fat | 1.2 | <0.1 |
| Others (e.g., Pentosan and Hemicellulose) | 10.0 | 0.2 |

EXAMPLE 2

The process as described in Example 1 was repeated as far as the separation of the gluten from the 'B' starch. The 'B' starch stream was decanted and, as a 23.8% by weight suspended or dissolved solids slurry, was fed at about 875 liters/hour to a buffer tank provided with a stirrer. An 8% by weight solution of sodium hydroxide was also added to the buffer tank at the rate required to maintain a pH of 10 within the tank. The level in the tank was controlled to give a minimal residence time of 30 minutes by means of a pump which fed slurry from the tank to a first decanter at a rate of about 1150 liters/hour. The underflow from the first decanter was mixed with fresh water supplied at a rate of 290 liters/hour and, after dispersion in a mixing pump, was fed to a second decanter. The washwater overflowing the second decanter was returned to the buffer tank while the starch underflow was neutralized with dilute hydrochloric acid to pH 6.2. The temperature of the starch extraction was ambient.

The 'B' starch treated by the process, compared with the untreated 'B' starch, had the following properties:

|  | Untreated 'B' Starch (%) | Treated 'B' Starch (%) |
|---|---|---|
| Starch Content | 88.9 | 99 |
| Protein Content (N × 5.7) | 2.8 | 0.3 |
| Ash Content | 0.75 | 0.4 |
| Others | 7.55 | 0.3 |

As in Example 1, the percentages are weight/weight on a dry basis.

EXAMPLE 3

The process described in Example 2 was repeated with the following changes:

The feed rate of slurry to the buffer tank was approximately 1600 liters/hour.

The pH in the buffer tank was maintained at 10.5.

The fresh water temperature was 45° C. instead of ambient, giving a temperature for the process of 40° to 45° C.

The comparative analyses of residual starch and treated starch were as follows:

|  | Untreated 'B' Starch (%) | Treated 'B' Starch (%) |
|---|---|---|
| Starch Content | 88.8 | 98.9 |
| Protein Content (N × 5.7) | 2.9 | 0.3 |
| Ash Content | 0.85 | 0.45 |
| Others | 7.45 | 0.35 |

As before, the percentages are weight/weight on a dry basis.

EXAMPLE 4

Using conventional techniques, the products of Examples 1 to 3 were hydrolyzed enzymatically to an 18 D.E. (dextrose equivalent) maltodextrin and a 42 D.E. syrup, respectively. For comparison purposes, similar products were made from high quality 'A' starch obtained from the hydrocyclone (after washing and drying) and from untreated 'B' starch from the gluten screening. The filtration rates, color and clarity of the products are given in the following table:

|  | Filtration Rate (l/m²/hr) | Clarity (%) | Color |
|---|---|---|---|
| 18 D.E. Maltodextrin from |  |  |  |
| High Quality 'A' Starch | 120 | 90 | 10 |
| Example 1 Starch | 135 | 93 | 9 |
| Example 2 Starch | 126 | 95 | 10 |
| Example 3 Starch | 125 | 94 | 8 |
| Untreated 'B' Starch | <30 | Extremely Cloudy | High Color |
| 42 D.E. Syrup from |  |  |  |
| High Quality 'A' Starch | 130 | 84 | 15 |
| Example 1 Starch | 125 | 78 | 17 |
| Example 2 Starch | 85 | 75 | 34 |
| Example 3 Starch | 135 | 94 | 11 |
| Untreated 'B' Starch | <30 | Extremely Cloudy | High Color |

Clarities were determined by an optical density method.

Filtration was through a standard precoat filter.

Color was measured by Method E-16 of the "Standard Analytical Methods of the Corn Refiners Association". -

Thus, it is apparent that there has been provided, in accordance with the invention, a process for the production of starch and gluten from wheat flour or similar flour that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A process for the production of starch and gluten from wheat flour or similar flour which comprises mixing the flour with water to release gluten from starch in the flour; separating the mixture of flour and water into a gluten fraction and a starch fraction; then separating a 'B' starch from either the starch fraction or the gluten fraction; contacting the 'B' starch with an aqueous alkaline solution at a pH between about 8.5 and about 12.5; and separating starch from the aqueous alkaline solution.

2. A process according to claim 1 wherein the alkaline solution is a sodium hydroxide solution.

3. A process according to claim 1 wherein the pH of the aqueous alkaline solution is between about 10 and about 11.

4. A process according to claim 1 wherein the time for which the 'B' starch is contacted with the aqueous alkaline solution is between about 2 minutes and about 3 hours.

5. A process according to claim 1 wherein the aqueous alkaline solution contains about 0.5 to about 20 weight % solid alkali.

6. A process according to claim 1 wherein the 'B' starch is contacted with the aqueous alkaline solution in a continuous process.

* * * * *